(12) United States Patent
Lifson et al.

(10) Patent No.: US 9,890,982 B2
(45) Date of Patent: Feb. 13, 2018

(54) DISCRETE FREQUENCY OPERATION FOR UNIT CAPACITY CONTROL

(75) Inventors: Alexander Lifson, Manlius, NY (US);
Michael F. Taras, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 1242 days.

(21) Appl. No.: 13/057,945

(22) PCT Filed: Jul. 22, 2009

(86) PCT No.: PCT/US2009/051408
§ 371 (c)(1),
(2), (4) Date: Feb. 7, 2011

(87) PCT Pub. No.: WO2010/017033
PCT Pub. Date: Feb. 11, 2010

(65) Prior Publication Data
US 2011/0138826 A1    Jun. 16, 2011

(51) Int. Cl.
*F25B 49/00* (2006.01)
*F25B 49/02* (2006.01)

(52) U.S. Cl.
CPC ........ *F25B 49/025* (2013.01); *F25B 2500/13* (2013.01); *F25B 2600/0253* (2013.01); *Y02B 30/741* (2013.01)

(58) Field of Classification Search
CPC ............... F02B 49/025; F02B 2500/13; F02B 2600/0253; Y02B 30/741
USPC .... 62/228.4, 115, 186, 215, 226, 228.1, 230
See application file for complete search history.

(56) References Cited

U.S. PATENT DOCUMENTS

| | | |
|---|---|---|
| 5,210,684 A | 5/1993 | Nam |
| 5,771,704 A | 6/1998 | Nakajima et al. |
| 6,434,960 B1 | 8/2002 | Rousseau |
| 6,668,571 B1 | 12/2003 | Bertotti et al. |

(Continued)

FOREIGN PATENT DOCUMENTS

| | | |
|---|---|---|
| CN | 101086251 A | 12/2007 |
| CN | 101194131 A | 6/2008 |

(Continued)

OTHER PUBLICATIONS

Notification of Transmittal of the International Search Report and the Written Opinion; PCT/US2009/051408; dated Jul. 22, 2009; Korean Intellectual Property Office.

(Continued)

*Primary Examiner* — Len Tran
*Assistant Examiner* — Ana Vazquez
(74) *Attorney, Agent, or Firm* — Cantor Colburn LLP

(57) ABSTRACT

A variable speed electric drive for use in refrigerant systems includes an electric motor for driving an associated component at a variable speed that is a function of an operating frequency of the motor; and a control for supplying alternating discrete drive frequencies to the electric motor to provide a continuously variable speed drive of the associated component. The control cycles the drive frequency to the electric motor among the at least two discrete frequencies so that the variable average resultant speed at which the associated component is driven is a function of a combination of the selected at least two discrete frequencies.

7 Claims, 3 Drawing Sheets

(56) References Cited

U.S. PATENT DOCUMENTS

| | | | |
|---|---|---|---|
| 7,451,609 B2 * | 11/2008 | Umeoka | F04B 39/0207 318/778 |
| 2006/0198744 A1 * | 9/2006 | Lifson et al. | 417/423.1 |

FOREIGN PATENT DOCUMENTS

| | | |
|---|---|---|
| EP | 0490089 A2 | 6/1992 |
| JP | 54-158631 A | 12/1979 |
| JP | 63-290192 A | 11/1988 |
| JP | 6002926 A | 1/1994 |
| JP | 09-119693 | 5/1997 |
| JP | H11287497 A | 10/1999 |
| JP | 2000-146318 | 5/2000 |
| JP | 2005-164188 | 6/2005 |
| WO | 2006132638 | 12/2006 |

OTHER PUBLICATIONS

European Office Action and Communication; Application No. 09805347.3-1602; dated Dec. 8, 2016; 5 pages.

* cited by examiner

DISCRETE FREQUENCY OPERATION FOR UNIT CAPACITY CONTROL

BACKGROUND

Electric motors have been widely used in refrigerant systems to drive compressors, fans, pumps, and various other components. As is known, in a basic refrigerant system, a compressor compresses a refrigerant, which is then sent to a first heat exchanger (usually a condenser or a gas cooler). After exiting the first heat exchanger, the refrigerant is then passed through an expansion device where the temperature of the refrigerant drops below the temperature of the air to be cooled and delivered to a climate-controlled environment. The refrigerant is then sent through second heat exchanger. Typically this second heat exchanger is an evaporator where the refrigerant absorbs the heat from the air (cooling the air), evaporates, and reenters the compressor.

In order to better control a refrigerant system and enhance the system efficiency, variable speed electric motors have increasingly been used in such systems. Variable speed drives provide a designer with enhanced flexibility in system operation and control. For a standard electric motor, the speed at which the motor operates is a function of an input frequency and the number of poles in the motor. Therefore, to vary the speed at which the motor drives an associated component of the refrigerant system, one can vary the input frequency of the electric motor to subsequently allow the motor to drive a component at a different speed. Thus, variable speed motors and associated driven equipment of the refrigerant system can operate across a wide spectrum of operational frequencies. A control for the variable speed motor may change the operational frequency as conditions or thermal load demands faced by the refrigerant system change. Typically, the variable speed motor starts from a frequency of zero and is ramped up toward a desired operational frequency. Thus, the frequency advances from zero upwardly to a set point operational frequency, which may be selected to achieve a desired cooling capacity, etc. Further, at shutdown, the frequency decreases from that operational frequency back towards zero.

A problem with these systems, however, is that certain operational frequencies create undesirable conditions such as mechanical and acoustic resonance, which may cause noise and excessive vibration in the components of a refrigeration system. The above-described systems, with the motor frequencies starting from zero and advancing upwardly towards the desired operational frequency, may pass through these resonance frequencies both at start-up and shutdown. Also, as the control changes frequencies during operation to satisfy external thermal load demands, it may sometimes move the electric motor operation to one of the resonance frequency zones that should be avoided.

This is undesirable, as excessive vibration, noise and pulsations may occur and result in damage of the refrigerant system components. The system resonance frequencies can also be excited by multiples of motor running speed frequencies, or by the running frequencies (or their multiples) of the driven equipment itself. It should be pointed out that the equipment running speed frequency can be different than that of the motor, if for example the driven equipment is attached to the motor via a gearbox, pulley or other similar means.

Some systems have attempted to overcome this problem by using stepless control and operating at these undesirable frequencies for a very limited time so as to avoid the resonance as much as possible. However, the methods used have not been able to entirely avoid the undesirable frequencies.

SUMMARY

In a disclosed embodiment, an electric motor drives an associated component of a refrigerant system at a desired variable speed that is a function of an operating frequency of the motor. In the present invention, the operating frequency of the motor is controlled by a control device by alternating the drive frequency to the electric motor between multiple drive frequencies such that the resultant speed at which the motor is driving the associated component of the refrigerant system is a function of a combination of the selected drive frequencies.

DETAILED DESCRIPTION

The variable speed control of an electric motor using multiple discrete frequencies is applicable to a wide range of refrigerant systems, including air conditioning, refrigeration, and heat pump systems. Both stationary systems (such as residential and commercial building comfort, freezer case and refrigerated merchandising applications) and transport systems (such as container and truck/trailer refrigeration and automotive/bus air conditioning applications) can make use of the variable speed control utilizing discrete frequencies. In particular, variable control of compressors can be achieved (in single and tandem configuration operation) using multiple discrete frequencies. The compressors may be any of a variety of different types, including reciprocating, scroll, screw, rotary and centrifugal types.

Figure 1:
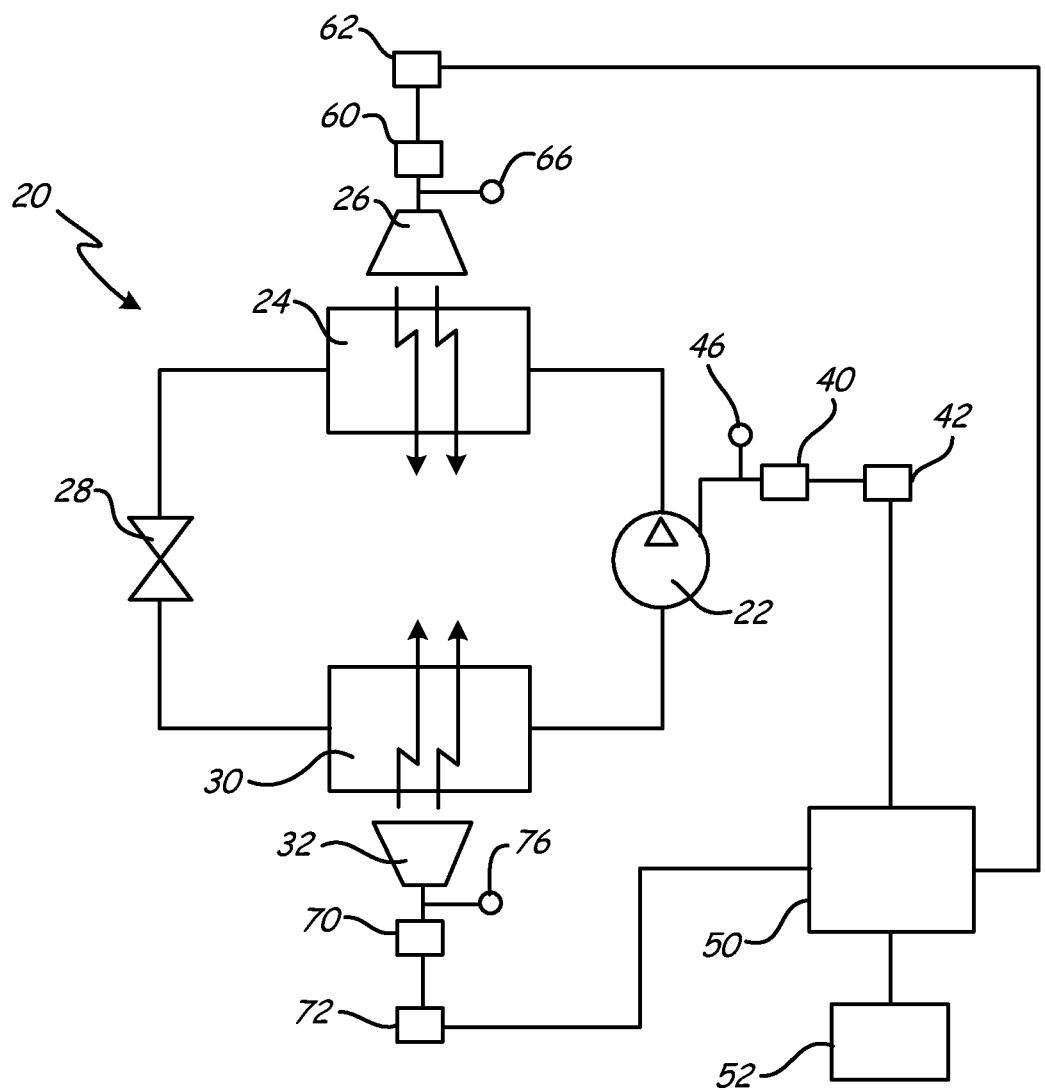
FIG. 1 is a schematic view of a refrigerant system incorporating the present invention.

FIG. 1 shows a basic refrigerant system 20 including a compressor 22 for delivering a compressed refrigerant to a first heat exchanger 24. First heat exchanger 24 is associated with an air-moving device such as fan 26 for driving air over first heat exchanger 24. After flowing through first heat exchanger 24, the refrigerant passes through an expansion device 28 and then enters a second heat exchanger 30. Second heat exchanger 30 also may be associated with an air-moving device such as fan 32.

Refrigerant system 20 is a generalized representation, and for example, may be any of the various types of refrigerant systems mentioned above. Depending on the particular type of system, additional components may also form a subsystem of refrigerant system 20.

Compressor 22 is driven by a motor 40, which is typically an induction type electric motor. A motor controller 42 is coupled to the motor 40 and controls the operation thereof. In one embodiment, the motor controller 42 controls the motor 40 to operate with variable speed control in a stepwise mode. Motor 40 may operate at frequencies up to 130 Hz, but typically operates in the range of 15-120 Hz and preferably in the range of 45-90 Hz.

Motor controller 42 can be arranged to operate the motor 40 constantly at a desired frequency, f0, or can alternate the operating frequency of the motor 40 between at least two frequencies (or bands of frequencies), f1 and f2. By alternating the operational frequency between at least two frequencies, the motor 40 can operate as if it were operating continuously at desired frequency f0 while avoiding the undesired characteristics (such as vibration, pulsation or acoustic resonance) of motor 40 or compressor 42 that may be associated with operating continuously at the frequency f0.

Motor controller 42 can operate at frequency f1 for a time interval, t1, and at frequency f2 for a time interval, t2, such that the average resultant operating frequency is f0. As an example, 50 Hz may be the desired frequency for operating compressor 22. In one solution, the configuration of the motor controller 42 operates the motor at 40 Hz for t1 and 60 Hz for t2 when t1=t2, or the motor controller 42 may alternate between operating at 20 Hz for t1 and 60 Hz for t2 when 3t1=t2, or other similar combinations. Alternatively, the motor control 42 can operate at more than two frequencies over a period of time such that the combination results in an average operating frequency of f0. The time that motor 40 operates at a specific frequency may be as short or as long as is desired (e.g. to avoid overcooling or undercooling a climate-controlled environment). If f1 and f2 are within a few Hz of each other, t1 and t2 may be longer (i.e. 5 min), without undesirable side effects such as mentioned above.

Figure 2A:
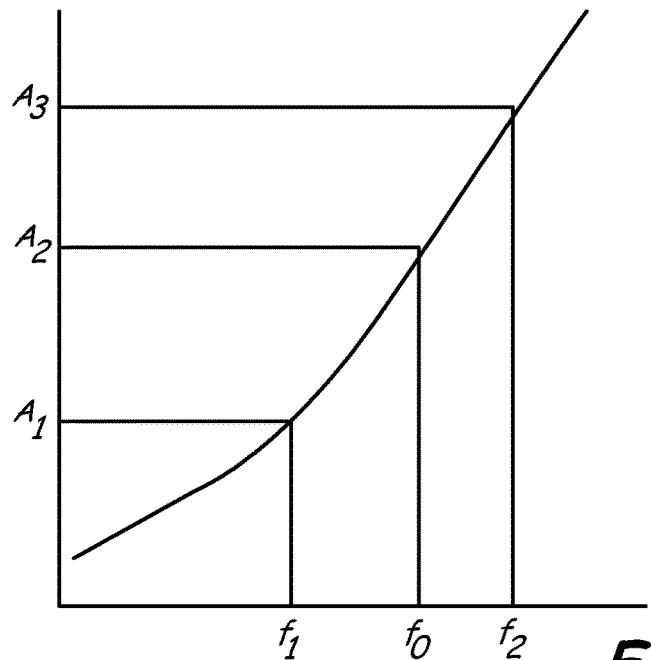
FIG. 2A is a graph of the capacity of the compressor versus the operational frequency of an electric motor attached to the compressor.
Figure 2B:
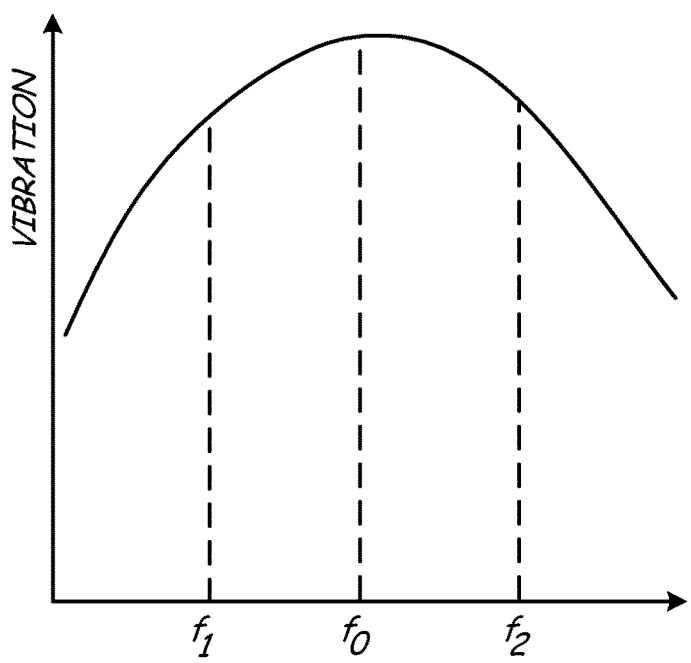
FIG. 2B is a graph of vibration in the compressor versus the operational frequency of an electric motor attached to the compressor.
Figure 2C:
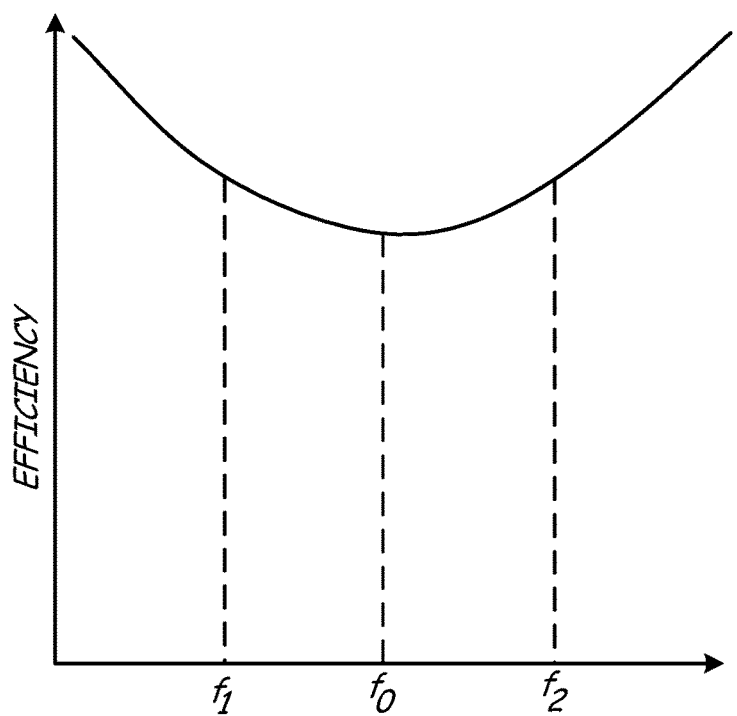
FIG. 2C is a graph of efficiency of the compressor versus the operational frequency of an electric motor attached to the compressor.

FIGS. 2A, 2B, and 2C show an example of the results that can be achieved by using the method of operating the motor 40 described herein. The frequencies would vary depending on the system operating and environmental conditions, thermal load demands and other factors. Certain desirable and undesirable frequencies may be determined experimentally, in a laboratory, or may be identified by various types of sensors, such as sensor 46 which may be mounted upon the component after or during the refrigerant system 20 assembly or installation.

As an example, FIG. 2A shows the capacity A of compressor 22 at three different frequencies, f. For this example, it is assumed that f1=38 Hz and f2=42 Hz. Assuming a desired capacity of A2, 40 Hz is the desired frequency f0 for operating compressor 22. However, as shown in FIG. 2B, the vibration is higher at 40 Hz, f0, than it is at 38 Hz, f1, and 42 Hz, f2. Furthermore, as shown in FIG. 2C, the efficiency of the compressor 22 at 40 Hz, f0, is lower than it is at 38 Hz, f1, and 42 Hz, f2. The same desired capacity, A2, can be achieved if the compressor is operated 50% of the time at 38 Hz and 50% of the time at 42 Hz, while improving the efficiency of compressor 22 and reducing vibration level.

As set forth in the above-identified examples, using the present invention, continuously variable output speed over the entire operation range of a compressor 22 can be achieved using a series of discrete drive frequencies. Variable speed operation is provided by supplying alternating discrete drive frequencies to the compressor motor 40, so that the output speed (and the capacity of the compressor) is continuously variable as a function of an average resultant frequency of the alternating discrete drive frequencies.

The motor controller 42 can include an on/off switch or a logical circuit capable of controlling the frequency at which the motor operates. Further, the motor controller 42 can be manually operated, pre-programmed, self-adjusting, adaptable or otherwise configured to provide the motor 40 with a desired operating frequency. A refrigerant 5 system control 50 may be associated with or include the motor controller 42. The refrigerant system control 50 may be operating based on user inputs via a user interface 52.

Additionally the motor controller 42 may have a setup or calibration mode that allows an operator to program the motor controller 42. In other embodiments of the refrigerant system 20, the motor controller 42 is self-adjusting and provides on-the-fly corrections in an operation mode where the motor controller 42 identifies a problem with a parameter such as excessive vibration, and adjusts one or both of the frequencies f1 or .f2 and thereby self-corrects to avoid an undesirable frequency. The motor controller 42 may also include or store data such as a lookup table of undesirable frequencies. Transducer 46 or other sensors within refrigerant system 20 can also be configured to identify one of the parameters, such as vibration or acoustics, associated with operation of the compressor 22 and transmit corresponding data to the motor controller 42 or system control 50. For redundancy purposes, multiple transducers 46 can be used throughout system 20 to determine undesirable operating conditions of the compressor 22.

Fans 26 and 32 can also be operated by the motors 60, 70 respectively, which are controlled by a corresponding fan controller 62, 72. In one embodiment, the fan controllers 62, 72 each include one or more of the features identified above with respect to the motor controller 42. As described above with respect to the compressor 22, at least one transducer 66, 76 may be associated with fans 26 and 32 to identify undesirable operating conditions (e.g. frequencies) for the fans. The refrigerant system 50 may also include or be coupled to the fan controllers 62, 72.

Other refrigerant system components, such as liquid pumps, driven by electric motors are within the scope and can equally benefit from the invention.

Although the present invention has been described with reference to preferred embodiments, workers skilled in the art will recognize that changes may be made in form and detail without departing from the scope of the invention as claimed.

The invention claimed is:

1. A refrigerant system comprising:
    an electric motor for driving an associated component at a variable speed that is a function of an operating frequency of the electric motor;
    a control for controlling the operating frequency of the electric motor to provide a continuously variable speed drive for the associated component by alternating the operating frequency of the electric motor between a first operating frequency and a second operating frequency so that the variable speed at which the component is driven is a function of a combination of the first operating frequency and the second operating frequency, the first operating frequency and the second operating frequency selected to avoid undesirable frequencies which create mechanical and acoustic resonance, wherein the first operating frequency and the second operating frequency are selected such that the motor operates as if the motor were operating at a selected desired operating frequency between the first operating frequency and the second operating frequency; and
    a sensor disposed at the refrigerant system and operably connected to the control, the sensor configured to communicate undesirable characteristics associated with an operating frequency to the control;
    wherein the control is self-adjusting, such that when mechanical or acoustic resonance is detected, the control adjusts the first operating frequency and/or the second operating frequency.

2. The system of claim 1, wherein the associated component is a compressor.

3. The system of claim 1 and further comprising:
a first heat exchanger connected to receive refrigerant from the compressor;
an expansion device connected to receive refrigerant from the first heat exchanger; and
a second heat exchanger connected to receive refrigerant from the expansion device and to supply refrigerant to the compressor.

4. The system of claim 1, wherein, the electric motor is operated at the first operating frequency for a first period of time and at the second operating frequency for a second period of time.

5. The system of claim 4, wherein the first period of time is equal to the second period of time.

6. The system of claim 1, wherein the sensor comprises a vibration sensor.

7. The system of claim 1, wherein the sensor comprises an acoustic sensor.

* * * * *